J. H. RUSBY.
CHUCK.
APPLICATION FILED DEC. 1, 1917.

1,270,444.

Patented June 25, 1918.
2 SHEETS—SHEET 1.

INVENTOR
Joseph H. Rusby
BY
Augustus B Streeghton
ATTORNEY.

WITNESS:
Robt P Kitchel.

UNITED STATES PATENT OFFICE.

JOSEPH H. RUSBY, OF NUTLEY, NEW JERSEY.

CHUCK.

1,270,444.　　　　Specification of Letters Patent.　　Patented June 25, 1918.

Application filed December 1, 1917. Serial No. 204,960.

*To all whom it may concern:*

Be it known that I, JOSEPH H. RUSBY, a citizen of the United States, and a resident of Nutley, in the county of Essex and State of New Jersey, have invented certain new and useful Improvements in Chucks, of which the following is a specification.

The principal objects of the present invention are, first, to provide a durable chuck which shall be strong mechanically and capable of efficiently gripping the shanks of tools of various sizes and kinds; second, to provide for the application for hand gripping power in such a way that the advantage of considerable leverage is obtained, and third, to provide an effective combination of comparatively simple parts constituting a relatively small chuck of wide application and adapted to operate as a two-way chuck, meaning, one in which the tool remains gripped no matter in which direction the chuck, as a whole, is rotated.

Other objects of the invention will appear from the following description which will be given in connection with the embodiment of it chosen for illustration in the accompanying drawings, in which—

Figure 2:
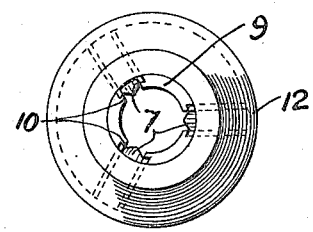
Fig. 2, is a top or plan view of the same.
Figure 3:
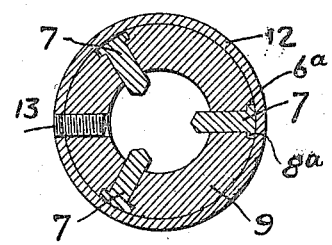
Fig. 3, is a section on the line 3—3 of Fig. 1.
Figure 1:
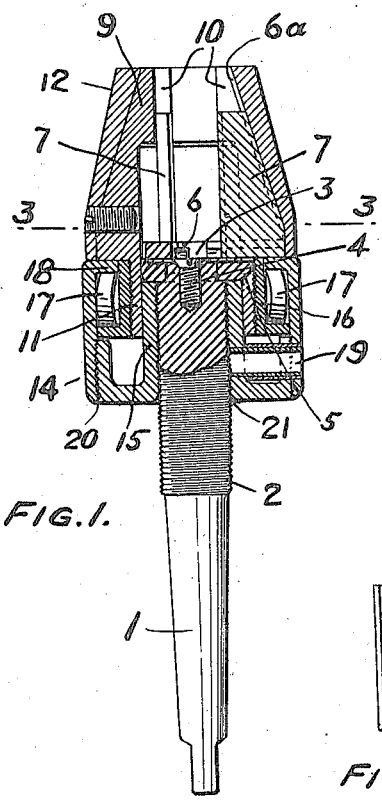
Figure 1, is an elevational view, principally in central section, of a chuck embodying features of the invention.
Figure 5:
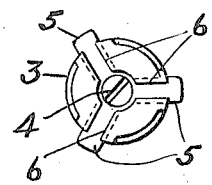
Fig. 5, is a top or plan view of Fig. 4.
Figure 4:
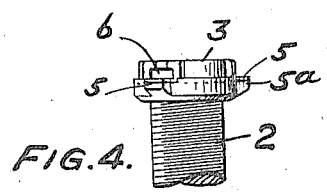
Fig. 4, is a view of the upper part of the headed spindle of which the head constitutes a base.
Figure 6:
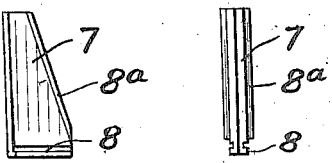
Figs. 6 and 7, are respectively a side view and an elevation of one of the jaws.
Figure 7:
Figure 9:
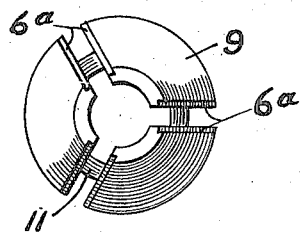
Figs. 8, 9, 10 and 11 are respectively a central section, a top view, a bottom view, and an elevation of the inner part of the jaw-shell.
Figure 12:
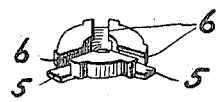
Fig. 12, is a perspective view of one part of the base.
Figure 8:
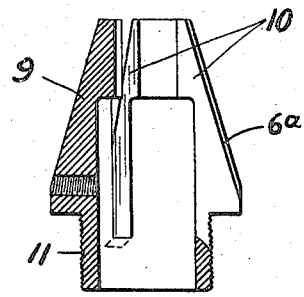
Figure 11:
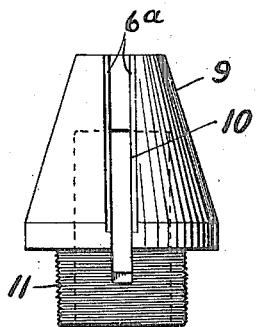
Figure 10:
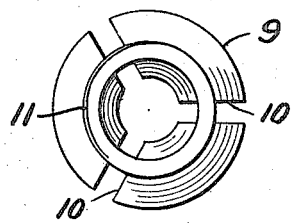
Figure 13:
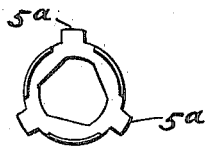
Figs. 13 and 14, are respectively a plan and a side view of the other part of the base.
Figure 14:
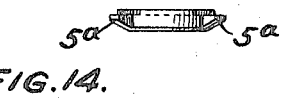
Figure 16:
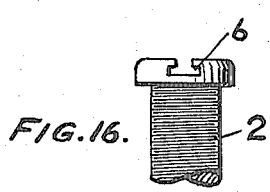
Fig. 16, is a view illustrating a base embodying a modification.
Figure 15:
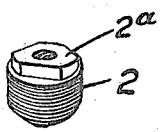
Fig. 15, is a perspective view of the shouldered end of the spindle.

In the drawings 1, is a spindle threaded as at 2 and provided with a base. As shown, Fig. 5, the base 3 consists of two parts and is secured to the spindle by means of a screw 4, but this is not essential as the structure can be made in one piece. The base is rotatively fixed in respect to the spindle and is provided with undercut radial grooves 6 and may be provided with projections 5. Where the base 3, is made in two parts, one of these parts, shown in Fig. 12, is provided with parts of the projections 5 and with the undercut grooves 6, and the other part of the base, shown in Figs. 13 and 14, is provided with parts $5^a$, of the projections 5, and is adapted to receive a shoulder $2^a$, on the end of the spindle. This shoulder $2^a$, is shown as flat-sided to help in connecting the base and spindle in fixed rotative relation. By making the base in two parts the assemblage is facilitated, as will be described. 7, are jaws provided with extending feet 8, radially slidable in said undercut grooves and with feet or ribs $8^a$, so that, in respect to endwise movement, the jaws move with the spindle but can move also radially of the base 3. 9, is a jaw-shell rotatively fixed and longitudinally movable in respect to the spindle 1 and having slots 10 for inclosing the jaws and having a contracted extension 11 with space between it and the spindle. The projections 5 of the base, when present, are arranged in the slots 10 of the jaw-shell so that the spindle and shell turn as one piece but are movable endwise in respect to each other. The jaw-shell is shown as consisting of an inner part through which the slots are cut and an outer part or cap 12 which may be put on and secured to place as by a screw 13, after the jaws have been slipped into their slots. Collectively 14 is an operating shell rotatably connected with the jaw-shell through the media of rollers 17 and bushing 16 and with the spindle directly by a reëntrant, contracted tapped neck 15 engaging the threaded portion of the spindle and arranged in the space between the spindle and the jaw-shelled extension 11. 16, is a bushing attached as by means of a thread to the extension 11 of the jaw-shell and constituting one member or race of a roller bearing, of which the rollers are indicated at 17. 18 is the other element or race of the roller bearing and it is secured to the rest of the jaw operating shell. One way of securing the part 18 to the rest of the shell is to employ a tool receiving piece 19 in connection with the thread 20.

When the shell 14 is turned, it is shifted by the thread 21 in respect to the spindle 1 in an endwise direction depending upon which way it is turned and rotatively considered, all the other parts of the chuck remain at rest. Such endwise movement causes the jaws, by reason of the feet 8 and 8$^a$ thereof, to move toward or away from the axis of the chuck. In the opening movement of the jaws the overhanging portions of the grooves 6 and 6$^a$, coöperating with the feet 8 and ribs 8$^a$, cause the jaws to move endwise with the spindle while permitting them to slide radially. Torque is transmitted from the spindle to the jaw-shell by means of the extensions 5 which, when present, relieve the jaws from the strain of the torque. When a tool has been gripped by the jaws by turning the operating shell 14, it is evident that the gripping will continue no matter which way the chuck is turned, until the shell 14 is again turned manually. Ordinarily the cap 14 can be turned by hand but, if desired, a tool such as the shank of a file can be inserted in the tool receiver 19 and used as a means for helping to turn the operating shell 14. Evidently the spindle 1 and base 3 are of less diameter than the radial diameter of the jaws when contracted and this is a matter of obvious importance. In assembling the device the parts of the base shown in Figs. 12 and 13 may be inserted through one of the slots 10 and properly positioned with the projections 5 and 5$^a$, in the slots 10; whereupon the spindle can be inserted into the cavity in the jaw operating shell and the screw 4, inserted to hold the parts in place.

What I claim is:

1. A chuck comprising a rotatable spindle, a base fixed in respect to the spindle, radially extendible and contractible jaws supported to rotate in unison with the base and spindle, said spindle and base being of less diameter than the radial diameter of the jaws when radially contracted, and a jaw operating shell inclosing said base and jaws, said shell being of contracted diameter for operative support on said spindle.

2. A chuck comprising a rotatable spindle, and a base fixed in respect to the spindle, radially extendible and contractible jaws supported to rotate in union with the base and the spindle, a jaw operating shell section inclosing said jaws, a bushing fast on said shell section and underlying the jaws and constituting an element of a roller bearing, and a second shell section constituting the other element of the roller bearing, said second shell section being operatively supported on said spindle.

3. A chuck comprising a rotatable spindle and a base, jaws operatively supported on the base, a jaw operating shell inclosing the jaws, base and part of the spindle with space between the spindle and peripheral wall of shell, and a tightening tool-receiving transverse port extending through said peripheral wall of the shell.

4. A chuck comprising a rotatable spindle and a base, jaws operatively supported on the base, a jaw operating shell section inclosing the jaws and base, a second shell section operatively supported on said spindle, and a space between the spindle and first stated shell section, and a tubular tightening tool-receiving piece, said piece constituting also a means for fixedly joining the two said shell sections, substantially as described.

5. A two-way chuck comprising the combination of a spindle and jaw supporting base, a jaw operating shell in which the spindle and jaw base are longitudinally movable and rotatably fixed, jaws arranged in the jaw shell and movable endwise with the spindle and connected with the base for radial movement and rotatable in unison with both base and jaw shell, and an operating shell rotatable in respect to the jaw shell and having a reëntrant contracted neck threadably engaging the spindle to actuate the parts.

6. A two-way chuck comprising the combination of a threaded spindle, a base fixed in respect to the spindle and provided with radial projections and undercut grooves, jaws provided with extending feet and radially slidable in the undercut grooves, a jaw shell rotatably fixed and longitudinally movable in respect to the spindle and having a contracted extension with annular space between it and the spindle, and an operating shell rotatably connected with the jaw shell and spindle and having a tapped contracted neck engaging the threaded portion of the spindle and arranged in the space between it and the jaw shell extension.

7. In a chuck the combination of a jaw shell of relatively large and small internal diameters and provided with slots extending from the relatively large part through the relatively small part, a sectional jaw base fitting in the relatively large portion of the shell and of which the sections may pass through the slots and are each provided with projections adapted to extend into the slots, a spindle, and means for connecting the spindle and base sections, substantially as described.

8. A chuck comprising the combination of a tapering jaw shell provided with grooved slots and a fixed covering cap, a base arranged in the jaw shell provided with radial undercut grooves alined with said slots, jaws arranged in the slots and provided with feet working in the grooves of the slots and in the undercut grooves, and an operating shell turnably connected with the jaw shell and having a contracted neck.

9. A chuck comprising a jaw shell provided with internally open tapering slots, a base arranged in the cavity of the jaw shell, jaws arranged in the slots and slidably connected with both base and jaw shell, a spindle rigid with the base, and an operating shell turnably and endwise immovably connected with the jaw shell and having a neck of less diameter than the jaw shell threadably connected with the spindle to actuate the parts, substantially as described.

Newark, New Jersey, this 28th of November, 1917.

JOSEPH H. RUSBY.

Copies of this patent may be obtained for five cents each, by addressing the "Commissioner of Patents, Washington, D. C."